US010650372B2

(12) United States Patent
Khan

(10) Patent No.: US 10,650,372 B2
(45) Date of Patent: May 12, 2020

(54) APPARATUSES AND METHODS FOR MANAGING PAYMENT APPLETS ON A SECURE ELEMENT TO CONDUCT MOBILE PAYMENT TRANSACTIONS

(71) Applicant: Apple Inc., Cupertino, CA (US)

(72) Inventor: Ahmer A. Khan, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 803 days.

(21) Appl. No.: 14/475,384

(22) Filed: Sep. 2, 2014

(65) Prior Publication Data

US 2015/0348008 A1    Dec. 3, 2015

Related U.S. Application Data

(60) Provisional application No. 62/004,837, filed on May 29, 2014.

(51) Int. Cl.
*G06Q 20/32* (2012.01)
*G06Q 20/38* (2012.01)

(52) U.S. Cl.
CPC ....... *G06Q 20/3227* (2013.01); *G06Q 20/322* (2013.01); *G06Q 20/382* (2013.01)

(58) Field of Classification Search
None
See application file for complete search history.

(56) References Cited

U.S. PATENT DOCUMENTS

| 8,126,806 | B1 | 2/2012 | DiMartino et al. |
| 8,903,093 | B2 | 12/2014 | Kim et al. |
| 2011/0112918 | A1* | 5/2011 | Mestre ............. G06Q 20/20 705/16 |
| 2012/0095852 | A1* | 4/2012 | Bauer ............. G06O 20/20 705/16 |
| 2013/0073448 | A1* | 3/2013 | Wall ............. G06Q 20/3278 705/39 |
| 2014/0209672 | A1 | 7/2014 | Mastere et al. |
| 2014/0279437 | A1 | 9/2014 | Lee et al. |
| 2015/0019418 | A1 | 1/2015 | Hotard et al. |

* cited by examiner

Primary Examiner — Steven S Kim
Assistant Examiner — Timothy Paul Sax
(74) Attorney, Agent, or Firm — Treyz Law Group, P.C.; Jason Tsai

(57) ABSTRACT

A system for provisioning credentials onto an electronic device is provided. The user device may include a secure element and a corresponding trusted processor. A contactless registry service (CRS) applet running on the secure element may be used to manage the activation of one or more associated payment applets during a mobile payment transaction. The CRS applet may include at least a user input received flag and an authorization received flag. The user input received flag may be asserted in response to detecting a required user input for initiating payment. The authorization received flag may be asserted when the trusted processor sends an activation request to the secure element. A payment applet should only be activated when at least one of the user input received flag and the authorization received flag has been asserted.

21 Claims, 8 Drawing Sheets

US 10,650,372 B2

APPARATUSES AND METHODS FOR MANAGING PAYMENT APPLETS ON A SECURE ELEMENT TO CONDUCT MOBILE PAYMENT TRANSACTIONS

CROSS-REFERENCE TO RELATED APPLICATION(S)

This application is related to U.S. Provisional Patent Application Ser. No. 61/899,737, entitled "Using Bioauthentication in Near-Field-Communication Transactions," by Inventor Ahmer A. Khan, filed on Nov. 4, 2013, to U.S. Provisional Patent Application Ser. No. 62/004,840, entitled "Methods for Operating a Portable Electronic Device to Conduct Mobile Payment Transactions," by Inventors Ahmer A. Khan et al., also filed on May 29, 2014, and to U.S. Provisional Patent Application Ser. No. 62/004,832, entitled "Methods for Using a Random Authorization Number to Provide Enhanced Security for a Secure Element," by Inventors Ahmer A. Khan et al., also filed on May 29, 2014.

This application claims the benefit of provisional patent application No. 62/004,837, filed May 29, 2014, which is hereby incorporated by reference herein in its entirety.

BACKGROUND

This relates generally to electronic devices, and more particularly, to operating electronic devices to conduct mobile payment transactions.

Portable electronic devices such as cellular telephones are sometimes provided with near field communications (NFC) circuitry that allows the electronic devices to perform contactless proximity-based communications with a corresponding NFC reader. Oftentimes, the NFC circuitry in a user device is used to carry out financial transactions or other secure data transactions that require the user device to verify and access a commerce credential such as a credit card credential. The secure data that is necessary for performing such mobile financial transactions is typically stored on a secure element within an electronic device.

Consider a scenario in which the secure element stores secure data corresponding to a given credit card credential. The secure element should only output the secure data during an authorized mobile payment transaction. It may therefore be desirable to provide a way for the user to signal to the electronic device to temporarily activate the secure element during a transaction at a point-of-sale terminal.

SUMMARY

Apparatuses and methods for operating a portable electronic device to conduct mobile payment transactions are provided.

In accordance with one suitable embodiment, the electronic device may include a secure element and an associated processor that communicates with the secure element. The electronic device may be used to detect a user input for initiating a mobile payment transaction and asserting a user input flag in response to detecting the user input with a contactless registry service (CRS) applet running on the secure element. An authorized payment activation request may be sent from the processor to the secure element. In response to receiving the authorized payment activation request, the secure element may be used to determine whether the user input received flag has already been asserted. If the user input flag has already been asserted, a payment applet on the secure element may be temporarily activated. If the user input flag has not yet been asserted, an authorization received flag may be asserted with the CRS applet. The user input for initiating a mobile payment may be a double button press associated with an authorized user of the electronic device.

In accordance with another suitable embodiment, the portable electronic device may include a secure element for securely storing commerce credentials, a trusted processor that is configured to communicate with the secure element via a secure channel, and input-output devices for interfacing with an authorized user of the device.

The input-output devices may be used to detect some predetermined input from the authorized user for initiating a mobile payment transaction. For example, the user may double press on a button to signal to the device the intent to conduct an NFC-based financial transaction using the device at a merchant terminal. In accordance with an embodiment, the secure element may be provided with a contactless registry service (CRS) applet that asserts a "user input received" flag in response to detecting the predetermined user input.

When it is desired for the user device to carry out a financial transaction, the trusted processor may also send a payment activation request to the secure element. At this point, if the user input received flag is asserted, the CRS applet may be used to temporarily activate a corresponding payment applet on the secure element to carry out the current mobile payment transaction that is being requested by the user. If, however, the user input received flag is deasserted, the CRS applet may be used to assert an "authorization received" flag. At least one of the authorization received flag and the user input received flag has to be asserted prior to activating a payment applet on the secure element for payment.

Whenever one of the user input received flag or the authorization received flag is asserted, a timer that limits the amount f time within which the mobile payment transaction has to be completed is reset. Once the mobile payment transaction is complete, the timer may be stopped and the CRS applet may deactivate any currently active payment applet. If, however, the timer expires before any mobile payment transaction has had a chance to complete, the timer may send a timer expiry notification to the trusted processor and the CRS applet may deactivate any currently active payment applet (i.e., the current transactions has timed out). If desired, the CRS applet may be used to maintain yet other control flags for managing commercial transactions at the portable user device.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

DETAILED DESCRIPTION

Figure 1:
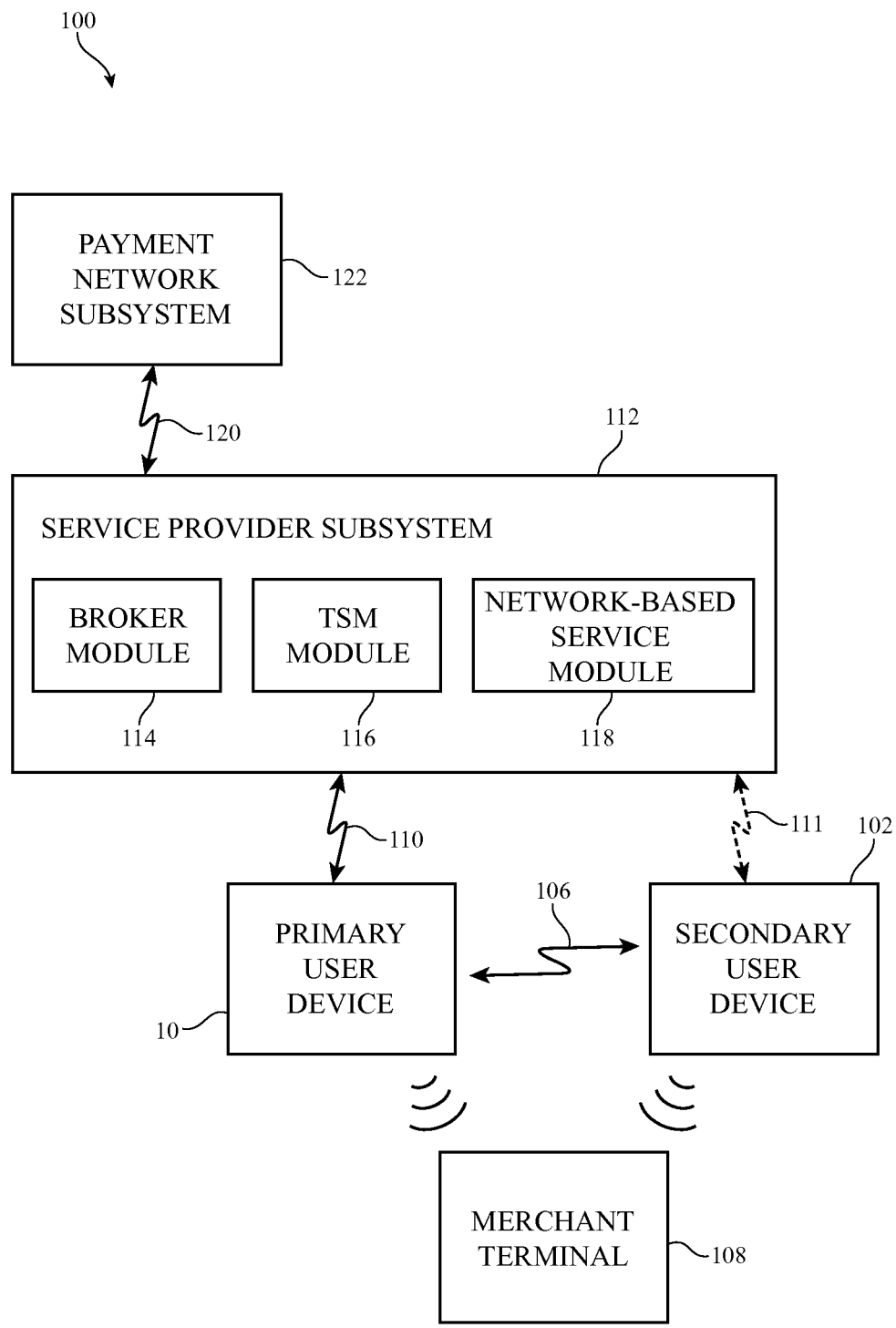
FIG. 1 is a diagram of an illustrative system for in which one or more user devices can be used to perform mobile payment transactions in accordance with an embodiment.

FIG. 1 shows a diagram of a system 100 in which credential information can be provisioned onto one or more electronic devices from a payment network subsystem 122 using a service provider subsystem 112. User devices that have been provisioned with commerce credentials from payment network subsystem 122 may be used to conduct a financial transaction with a merchant terminal such as merchant terminal 108. User devices may, for example, communicate with merchant terminal 108 via contactless proximity-based communications (e.g., using near field communications (NFC) standards). Terminal 108 (sometimes referred to as a "point-of-sale" terminal) may include an NFC reader for detecting, reading, or otherwise receiving information from a nearby electronic device.

For example, a user may hold a provisioned electronic device within range of merchant terminal 108 to initiate a commercial transaction. Actual physical contact between the user device and the merchant terminal need not be present. While the electronic device is within range of merchant terminal 108 (e.g., when the user device is within 10 cm of terminal 108, when the user device is within 5 cm of terminal 108, when the user device is within 1 cm of terminal 108, or when the distance between the user device and the merchant terminal has other suitable values), the electronic device may send a selected credential to merchant terminal 108. In response to receiving the selected credential, merchant terminal 108 may complete the payment by forwarding the received credential to a corresponding payment processor (not shown). The payment processor may utilize the user credential to complete the transaction with payment network subsystem 122. This example in which payment transactions are performed via NFC is merely illustrative and does not limit the scope of the present invention. If desired, financial transactions may be carried out over Bluetooth® communications links, personal area network (PAN) communications links, wireless local area network (WLAN) communications links, or other short-range wireless communications links.

Payment network subsystem 122 may be operated by a financial entity that includes a network of various issuing banks and/or acquiring banks (e.g., payment processors). The financial entity at the payment network subsystem 122 may serve as a generic payment card association (e.g., a credit card association) that partners with one or more issuing/acquiring banks that are associated with different brands of commerce credentials and may sometimes be referred to as a payment network operator. The payment network operator and associated issuing/acquiring banks may be a single entity or separate entities.

For example, American Express may be both a payment network operator and an issuing/acquiring bank. As another example, Visa and MasterCard may be a payment network operator that partners with other issuing/acquiring banks such as Bank of America, Wells Fargo, and Chase, just to name a few. The issuing bank may be the financial institution that assumes primary liability for each user's capability to pay off debts incurred using a particular brand of payment card. Various types of payment cards that can be issued may include but are not limited to: credit cards, debit cards, charge charges, stored-value cards, fleet cards, and gift cards.

User payment card credentials may be provisioned from such financial entities onto user devices using a service provider subsystem such as service provider subsystem 112. Service provider subsystem 112 may be configured to provide another layer of security and/or to provide a more seamless user experience. For example, service provider subsystem 112 may be operated by a commercial service entity that offers various services to the user, which may include: an online store for selling/renting media to be played by the user device, an online store for selling/renting applications to be run on the user device, an online storage service for backing up and synchronizing data among multiple user devices, a remote device management service for tracking the location of the user device and remotely controlling that device, an online store that allows the user to purchase additional user devices or products (e.g., products manufactured by that commercial entity), etc. As another example, service provider subsystem 112 may be operated by a mobile network operator such as Verizon or AT&T.

In either scenario, the commercial entity at the service provider subsystem 112 may at least provide different users with their own personalized accounts for accessing the services offered by that commercial entity. Each user account may be associated with a personalized user identification (or account ID) and password that the user may use to log in into his/her account. Once logged in, the user may be presented with the opportunity to provision one or more commerce credentials (e.g., payment cards) onto the user device to enable the user device to purchase items using services offered by the commercial entity and/or to perform financial transactions at a merchant terminal 108.

In general, the commercial entity at the service provider subsystem 112 and the financial entity at the payment network subsystem 122 are considered separate entities. The commercial entity may leverage any known credential information associated with each of its user accounts to more securely determine whether a specific credential offered by the payment network operator ought to be provisioned onto a given user device. If desired, the commercial entity may also leverage its ability to configure or control various components of the user device (e.g., via software of firmware updates) in order to provide a more seamless experience for the user when he or she wants to provision a credential offered by the payment network operator onto a given user device.

As shown in FIG. 1, service provider subsystem 112 may include a broker module 114, a trusted service manager (TSM) module 116, and a network-based service module 118. Broker module 114 may serve to manage user authentication with a commercial entity user account and may also serve to manage the lifecycle and provisioning of credentials onto a user device. Broker module 114 may also be configured to control the user interface (e.g., the graphical user interface) that is displayed on the user device and to process any user inputs related to provisioning commerce credentials on the user device. When it is desired to provision a card onto the user device, broker module 114 may send a notification to payment network subsystem 122 via path 120.

In response to receiving the notification from broker module 114, payment network subsystem 122 may communicate directly with TSM module 116 to carry out credential provisioning operations on the user device. TSM 116 may serve to provide GlobalPlatform or other secure transactions based services so that TSM 116 can set up a secure channel between service provider subsystem 112 and a secure element within the user device. Commerce credential, payment card information, and/or other sensitive account data may then be conveyed to the secure element in the device via the secure channel. In general, TSM 116 may use public/private keys or other cryptographic schemes to ensure that communication between service provider subsystem 112 and the secure element within the user device is secure.

Network-based service module 118 may serve to allow users to store data such as music, photos, videos, contacts, multimedia messages, emails, calendars, notes, reminders, applications, documents, device settings, and other information on a network of computing servers so that data can be synchronized across multiple user devices (e.g., module 118 allows users to back up data that is stored on their devices onto servers associated with the service provider subsystem). This backup data can be used to restore a user device or to set up new user devices (as examples).

Network-based service module 118 may also be configured to allow users to find lost devices (sometimes referred to as a "Find My Device" feature), to share media among different devices, and/or to keep sensitive information (e.g., commerce credential information, website account login information, Wi-Fi® account information, etc.) up to date across different user devices. Any sensitive user information may be stored as part of a user "keychain" that can be stored on the user device(s) and/or on the network-based service module 118. Only the authorized user should have access to the keychain. Contents in the keychain may be protected using industry standard encryption techniques (e.g., using at least 128-bit AES encryption). Module 118 configured in this way is sometimes referred to as a "cloud" storage or cloud computing module.

Still referring to FIG. 1, a user may be in possession of multiple devices such as devices 10 and 102. Device 10 may be referred to as a "primary" user device, whereas device 102 may be referred to as a "secondary" user device. In general, the primary user device 10 may be provided with more functions than the secondary user device 102. For example, primary user device 10 may serve as the user's main device for use in accessing an entire array of services offered by service provider subsystem 112, for making telephone calls, for selecting new cards to be provisioned on one of devices 10 and 102, for capturing images, and for accessing the Internet, whereas secondary user device 102 may serve as an accessory device for use in accessing only a subset of the services provided by the commercial entity at the service provider subsystem 112. However, it should be understood that the terms "primary" and "secondary" are used for ease of description and that, in some instances, the "secondary" device implement functionality identical to or greater than the functionality implemented by the "primary" device.

Either one of primary user device 10 or secondary user device 102 can be used to perform a mobile payment transaction at merchant terminal 108. Each device that is capable of conducting such types of NFC-based financial transactions may be provided with a secure element. The secure element may serve as a tamper-resistant component (e.g., as a single chip or multichip secure microcontroller) that is capable of securely hosting applications and their confidential and cryptographic data in accordance with rules and security requirements set forth by well-identified trusted authorities such as GlobalPlatform. The secure element (SE) may be provided as a universal integrated circuit card (UICC), an embedded SE, a smart secure digital (SD) card, a microSD card, etc. Sensitive user information such as credit card information and other commerce credentials may be stored on the secure element. The secure element provides a secure domain that protects the user's credentials and processes desired payment transactions in a trusted environment without compromising the safety of the user's data. In general, each secure element may have its own unique identifier sometimes referred to herein as the SEID. No two secure elements should have the same SEID, and the SEID cannot be altered.

In one suitable arrangement, the user may operate the primary user device 10 to provision one or more payment cards directly on the primary user device. In such arrangements, credential information may be retrieved from the payment network subsystem 122 and/or the service provider subsystem 112 and may be downloaded to a secure element within device 10 via path 110. Path 110 between subsystem 112 and device 10 may be supported via cellular telephone radio communications protocols or other long-range wireless communications technologies and/or via Bluetooth®, IEEE 802.11 protocols—sometimes referred to as WiFi®, or other short-range wireless communications technologies.

In another suitable arrangement, the user may operate the primary user device 10 to indirectly provision one or more payment cards onto the secondary user device 102. In such scenarios, the provisioning of credentials onto the secondary device 102 may be managed using a secondary device credential management application (sometimes referred to as a "bridging" application) running on the primary user device 10. In such arrangements, payment network subsystem 122 may provide the desired payment card information that is then securely written into a secure element on the secondary device 102 via the primary user device 10 and path 106. The communications path 106 between primary user device 10 and secondary user device 102 may be supported via Bluetooth® (e.g., via Bluetooth Low Energy and/or Bluetooth "Classic" technologies), IEEE 802.11 protocols—sometimes referred to as WiFi®, or other short-range wireless communications technologies (as examples). In yet other suitable arrangement, secondary device 102 may communicate directly with service provider subsystem 112 to obtain commerce credentials using any suitable long-range or short-range wireless communications standards (as indicated by path 111).

Figure 2A:
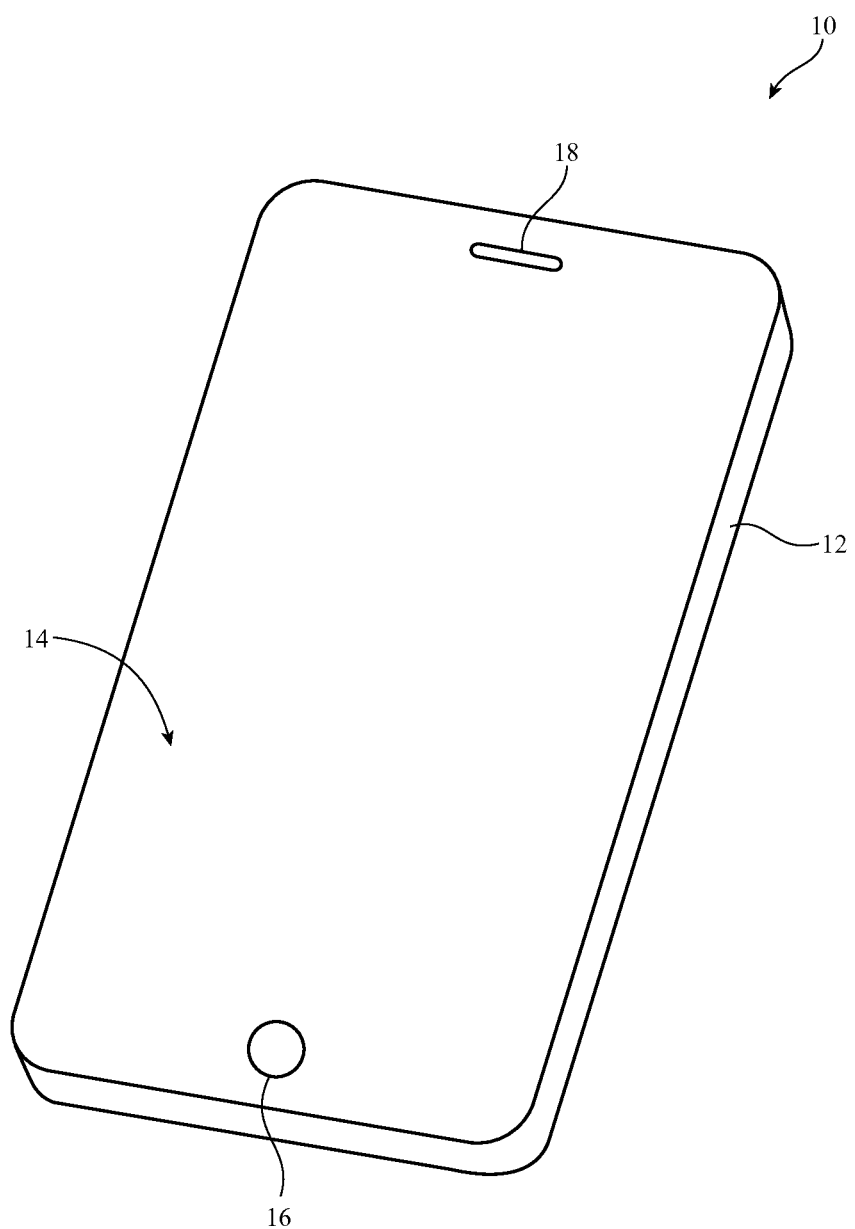
FIG. 2A is a perspective view of an illustrative primary user device in accordance with an embodiment.

FIG. 2A shows a perspective view of primary user device 10. Device 10 may be a portable device such as a cellular telephone, media player, tablet computer, or other portable computing device. The example of FIG. 2A is merely illustrative. Other configurations may be used for device 10, if desired. As shown in FIG. 2A, device 10 may include a display such as display 14. Display 14 has been mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials.

Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies.

Display 14 may be protected using a display cover layer such as a layer of transparent glass or clear plastic. Openings may be formed in the display cover layer. For example, an opening may be formed in the display cover layer to accommodate a button such as button 16. An opening may also be formed in the display cover layer to accommodate ports such as speaker port 18. Openings may be formed in housing 12 to form communications ports (e.g., an audio jack port, a digital data port, etc.).

Figure 2B:
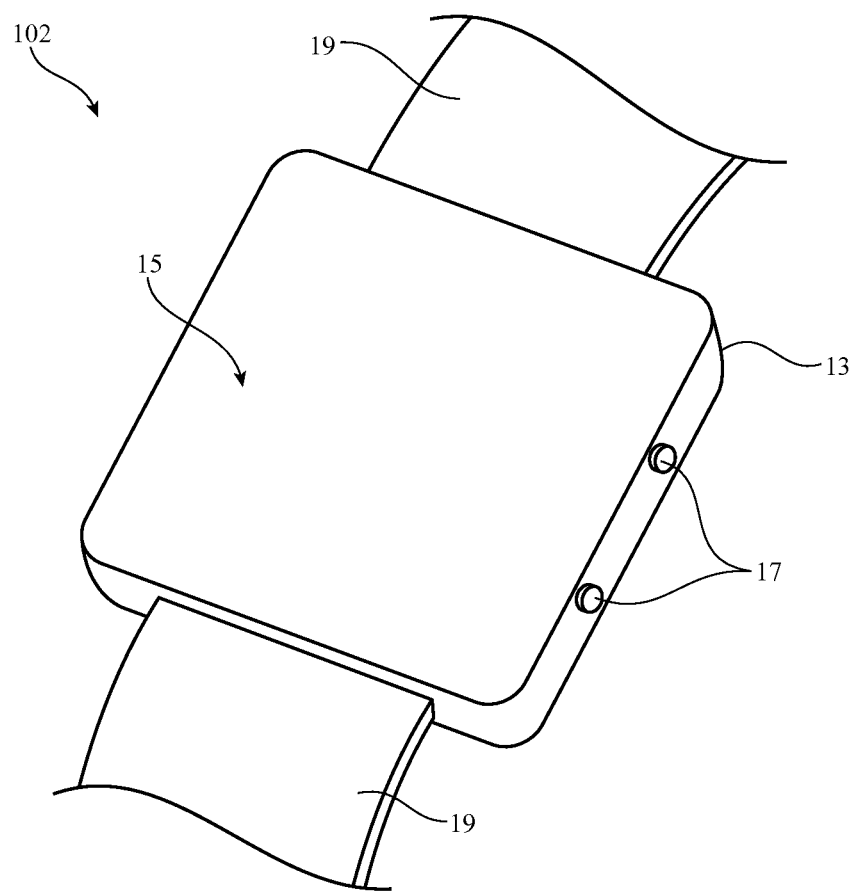
FIG. 2B is a perspective view of an illustrative secondary user device in accordance with an embodiment.

FIG. 2B shows a perspective view of a secondary user device 102. Electronic device 102 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In at least some embodiments, secondary user device 102 serves as an auxiliary device to primary device 10, where device 102 can be used to perform specialized functions for the user.

The example of FIG. 2B in which device 102 is shown as a wearable device such as a wrist-watch device with straps 19 is merely illustrative. As shown in FIG. 2B, device 102 may include a display such as display 15. Display 15 has been mounted in a housing such as housing 13. Housing 13, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 13 may be formed using a unibody configuration in which some or all of housing 13 is machined or molded as a single structure or may be formed using multiple structures (e.g., an internal frame structure, one or more structures that form exterior housing surfaces, etc.).

Display 15 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 15 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies. Display 15 may be protected using a display cover layer such as a layer of transparent glass or clear plastic.

Device 102 may have one or more buttons 17 which may be used to gather user input. Buttons 17 may be based on dome switches or other switch circuitry. Buttons 17 may include button members that form push buttons (e.g., momentary buttons), slider switches, rocker switches, etc. Device 10 may also have additional buttons, a speaker port, data ports such as a digital data port and an audio connector port, and/or other input-output devices, if desired. In some embodiments, at least one of buttons 17 on the secondary user device 102 may be used to enable device 102 for a secure mobile transaction.

Figure 3:
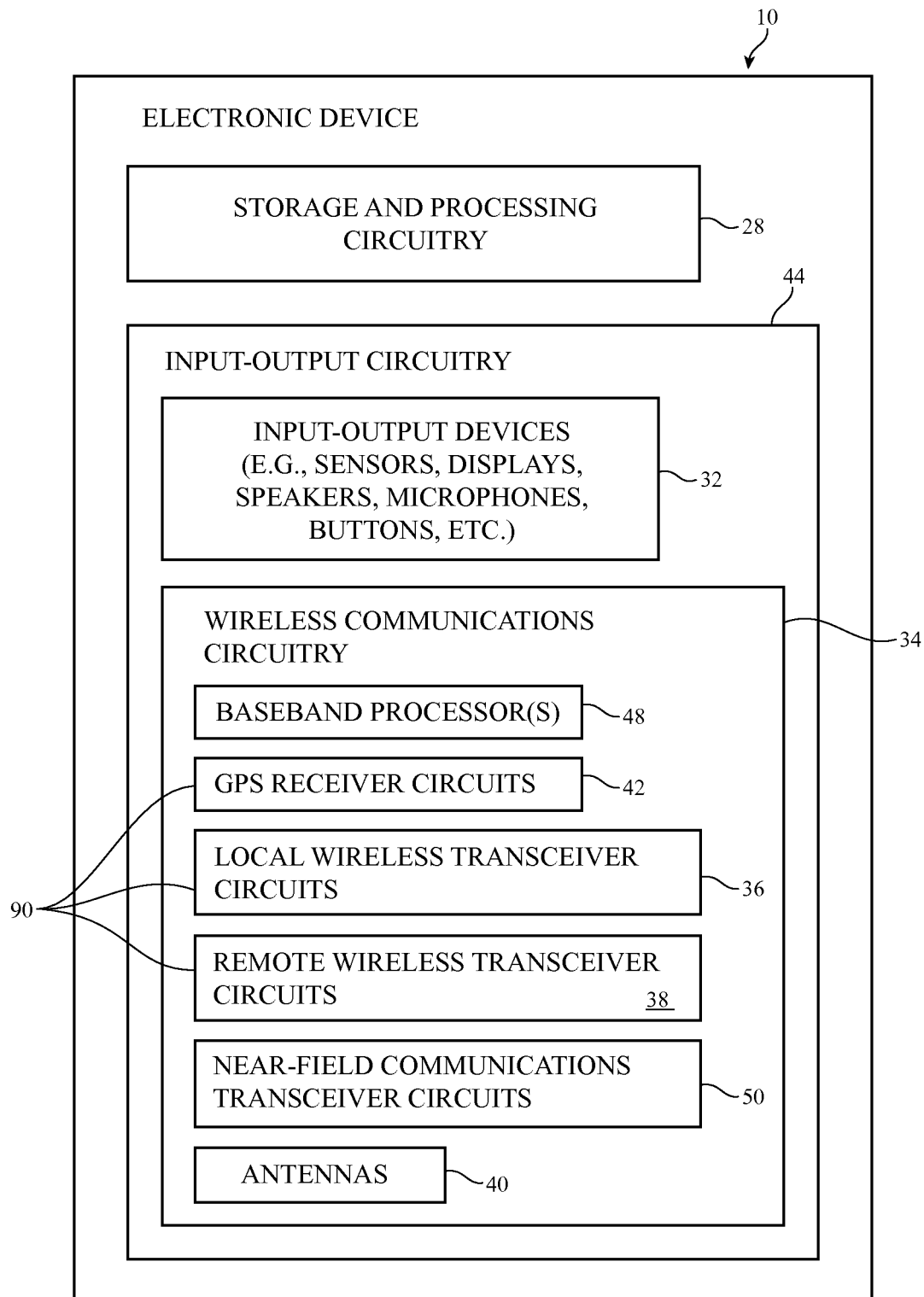
FIG. 3 is a schematic diagram of illustrative circuitry in the primary user device of FIG. 1 in accordance with an embodiment.

A schematic diagram showing illustrative components that may be used in device 10 is shown in FIG. 3. As shown in FIG. 3, device 10 may include control circuitry such as storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Storage and processing circuitry 28 may be used to run software on device 10, such as internet browsing applications, voice-over-internet-protocol (VOIP) telephone call applications, email applications, media playback applications, operating system functions, secondary device credential management applications, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, etc.

Input-output circuitry 44 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices 32 may include touch screens, displays without touch sensor capabilities, buttons, joysticks, click wheels, scrolling wheels, touch pads, key pads, keyboards, microphones, cameras, buttons, speakers, status indicators, light sources, audio jacks and other audio port components, digital data port devices, light sensors, motion sensors (accelerometers), capacitance sensors, proximity sensors, etc.

Input-output circuitry 44 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 34 may include radio-frequency transceiver circuitry 90 for handling various radio-frequency communications bands. For example, circuitry 34 may include transceiver circuitry 36 and 38. Transceiver circuitry 36 may be wireless local area network transceiver circuitry that may handle 2.4 GHz and 5 GHz bands for WiFi® (IEEE 802.11) communications and that may handle the 2.4 GHz Bluetooth® communications band. Circuitry 34 may use cellular telephone transceiver circuitry 38 for handling wireless communications in frequency ranges such as a low communications band from 700 to 960 MHz, a midband from 1710 to 2170 MHz, and a high band from 2300 to 2700 MHz or other communications bands between 700 MHz and 2700 MHz or other suitable frequencies (as examples). Circuitry 38 may handle voice data and non-voice data.

Wireless communications circuitry 34 may also include satellite navigation system circuitry such as global positioning system (GPS) receiver circuitry 42 for receiving GPS signals at 1575 MHz or for handling other satellite positioning data. Wireless communications circuitry 34 can include circuitry for other short-range and long-range wireless links if desired. For example, wireless communications circuitry 34 may include 60 GHz transceiver circuitry, circuitry for receiving television and radio signals, paging system transceivers, etc. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless circuitry 34 may also include near-field communications circuitry 50. Near-field communications circuitry 50 may produce and receive near-field communications signals to support communications between device 10 and a near-field communications reader or other external near-field communications equipment. Near-field communications may be supported using loop antennas (e.g., to support inductive near-field communications in which a loop antenna in device 10 is electromagnetically near-field coupled to a corresponding loop antenna in a near-field communications reader). Near-field communications links typically are generally formed over distances of 20 cm or less (i.e., device 10 must be placed in the vicinity of the near-field communications reader for effective communications).

Transceiver circuitry 90 and NFC circuitry 50 may be coupled to one or more baseband processors 48. Baseband processor 48 may receive digital data to be transmitted from circuitry 28 and may supply corresponding signals to at least one of wireless transceiver circuits 90 for wireless transmission. During signal reception operations, transceiver circuitry 90 and NFC circuitry 50 may receive radio-frequency signals from external sources (e.g., wireless base stations, wireless access points, GPS satellites, NFC readers etc.). Baseband processor 48 may convert signals received from circuitries 90 and 50 into corresponding digital data for circuitry 28. The functions of baseband processor 48 may be provided by one or more integrated circuits. Baseband processor 48 is sometimes considered to be part of storage and processing circuitry 28.

Wireless communications circuitry 34 may include antennas 40. Antennas 40 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, hybrids of these designs, etc. Different types of antennas may be used for different bands and combinations of bands. For example, one type of antenna may be used in forming a local wireless link antenna and another type of antenna may be used in forming a remote wireless link antenna. In addition to supporting cellular telephone communications, wireless local area network communications, and other far-field wireless communications, the structures of antennas 40 may be used in supporting near-field communications. The structures of antennas 40 may also be used in gathering proximity sensor signals (e.g., capacitive proximity sensor signals).

Radio-frequency transceiver circuitry 90 does not handle near-field communications signals and is therefore sometimes referred to as "far field" communications circuitry or non-near-field communications circuitry (e.g., transceiver circuitry 90 may handle non-near-field communications frequencies such as frequencies above 700 MHz or other suitable frequency). Near-field communications transceiver circuitry 50 may be used in handling near-field communications. With one suitable arrangement, near-field communications can be supported using signals at a frequency of 13.56 MHz. Other near-field communications bands may be supported using the structures of antennas 40 if desired.

Figure 4:
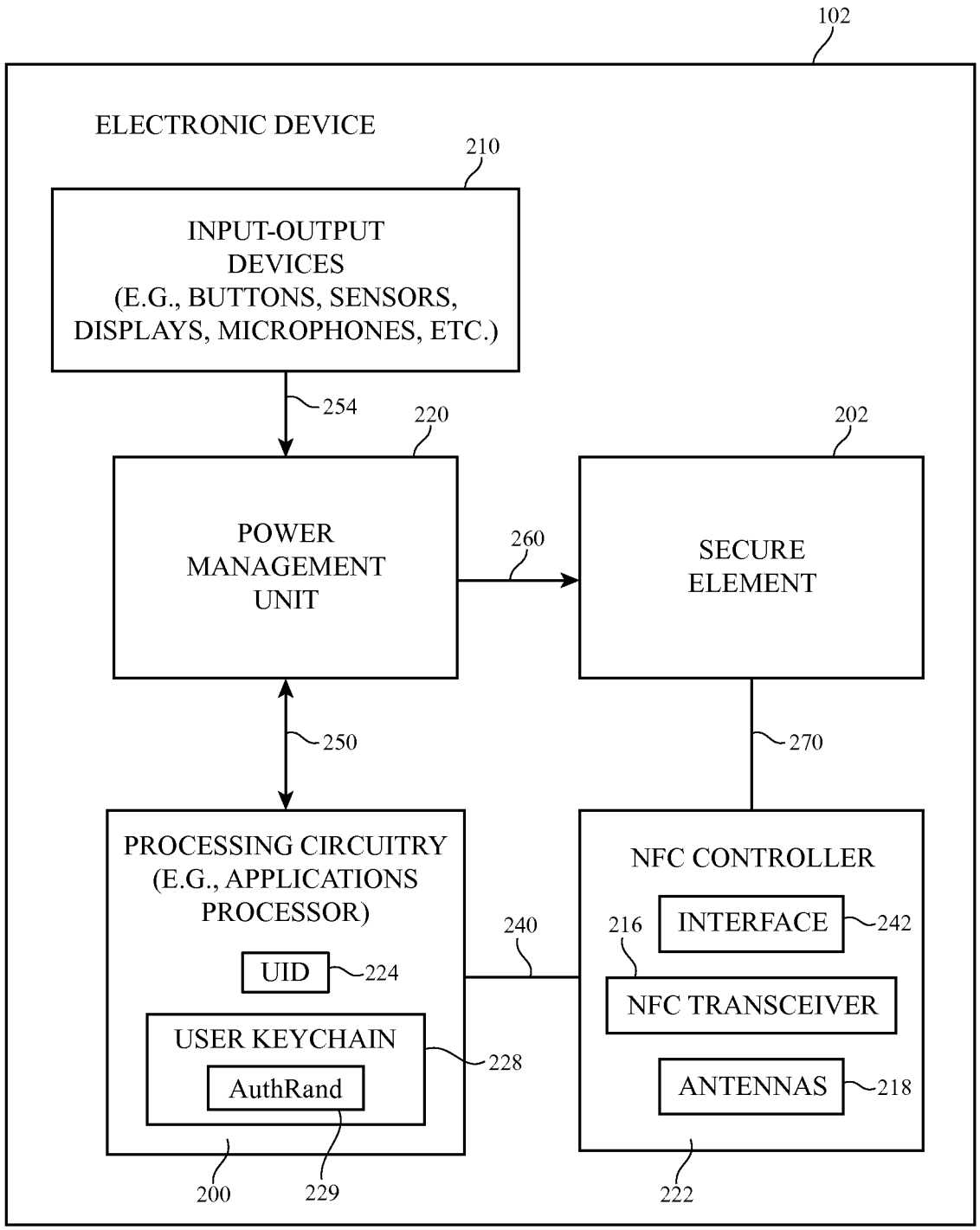
FIG. 4 is a schematic diagram of illustrative circuitry in the secondary user device of FIG. 1 in accordance with an embodiment.

A schematic diagram showing illustrative components that may be used in the secondary user device 102 is shown in FIG. 4. As shown in FIG. 4, device 102 may include control circuitry such as a main processor (sometimes referred to herein as the applications processor or AP) 200, input-output devices 210, a power management unit (PMU) such as power management unit 220, a secure element such as secure element 202, and an NFC controller 222. Applications processor 200 may be used to control the operation of device 102 and may access storage such as hard disk drive storage, nonvolatile memory (e.g., flash memory or other electrically-programmable-read-only memory configured to form a solid state drive), volatile memory (e.g., static or dynamic random-access-memory), etc. In general, processor 200 may be used to run software on device 102, such as internet browsing applications, voice-over-internet-protocol (VOIP) telephone call applications, email applications, media playback applications, operating system functions, etc. This processing circuit may be based on one or more microprocessors, microcontrollers, digital signal processors, application specific integrated circuits, etc.

Applications processor may be coupled to power management unit 220 via path 250. PMU 220 may, for example, be a microcontroller that governs the power functions for device 102. The PMU 220 should remain active (e.g., using a backup battery source) even when the rest of device 102 is idle or powered down. The PMU 220 may be responsible for functions including but not limited to: monitoring power connections and battery charges, controlling power to other circuit components within device 102, shutting down unnecessary system components when they are left idle, controlling sleep and on/off power functions, and/or actively managing power consumption for optimum user performance.

In the example of FIG. 4, PMU 220 is coupled to applications processor 200 (via path 250) and to secure element 202 (via path 260) and may be configured to selectively put these components to sleep or to wake these components up from sleep mode by sending appropriate control signals via paths 250 and 260, respectively. As shown in FIG. 4, PMU 220 may also be coupled to input-output devices 210 via path 254 and may also be configured to manage the I/O interface of device 102.

Input-output devices 210 may be used to allow data to be supplied to device 102 and to allow data to be provided from device 102 to external devices. Input-output devices 210 may include user interface devices, data port devices, and other input-output components. For example, input-output devices 210 may include buttons, biometric sensors (e.g., a fingerprint sensor, a retinal sensor, a palm sensor, a signature-identification sensor, etc.), touch screens, displays without touch sensor capabilities, joysticks, click wheels, scrolling wheels, touch pads, key pads, keyboards, microphones, cameras, speakers, status indicators, light sources, audio jacks and other audio port components, digital data port devices, light sensors, motion sensors (accelerometers), capacitance sensors, proximity sensors, etc.

For example, consider a scenario in which device 102 has its display turned off when device 102 is completely stationary. In response to detecting any motion at device 102 (e.g., using an accelerometer in device 102), the accelerometer 210 may send a corresponding signal to the PMU 220 via path 254. This signal may then direct PMU 220 to send another signal to applications processor 200 that results in the display being turned on to output some useful information such as the current time to the user of device 102.

In at least some embodiments, secure element 202 is normally placed in an inactive state. In response to detecting input from the user that is indicative of the desire to perform a financial transaction, one or more components in devices 210 may send a signal to PMU 220 via path 254, which in turn directs PMU 220 to send a wakeup signal to secure element 202 via path 260. Once the secure element 202 has been awakened, other operations can subsequently be performed to complete the financial transaction. These examples are merely illustrative. If desired, PMU 220 may be configured to handle other types of user input to provide device 102 with the optimum power savings.

Still referring to FIG. 4, NFC controller 222 may be interposed between the applications processor 200 and the secure element 202. NFC controller 222 may include an interface circuit 242 for linking applications processor 200 to secure element 202 (e.g., via paths 240 and 270). Applications processor 200 may serve as a "trusted processor" for communicating with secure element 202 via a secure channel. During a mobile payment transaction, secure element 202 may forward an encrypted version of a commerce credential that is stored on the secure element externally to an NFC reader at merchant terminal 108 (FIG. 1) using an NFC transceiver 216 and antenna(s) 218 within controller 222.

This is merely illustrative. In general, device 102 may include one or more baseband processors for handling NFC protocols, wireless local area network protocols (e.g., IEEE 802.11 protocols—sometimes referred to as WiFi®), protocols for other short-range wireless communications links such as the Bluetooth® protocol, cellular telephone protocols, internet protocols, MIMO protocols, antenna diversity protocols, etc. The baseband processing circuitry may be coupled to near-field communications circuitry 216 for producing and receiving near-field communications signals at 13.56 MHz to support communications between device 10 and/or a near-field communications reader or other external near-field communications equipment, wireless local area network transceiver circuitry for handling the 2.4 GHz and 5 GHz bands for WiFi® (IEEE 802.11) communications and the 2.4 GHz Bluetooth® communications band, and/or other suitable types of wireless transmitters/receivers for supporting short-range wireless links and long-range wireless links. If desired, device 102 may include any type of transmitter and receiver circuitry configured to support any suitable wireless communications protocols.

Figure 5:
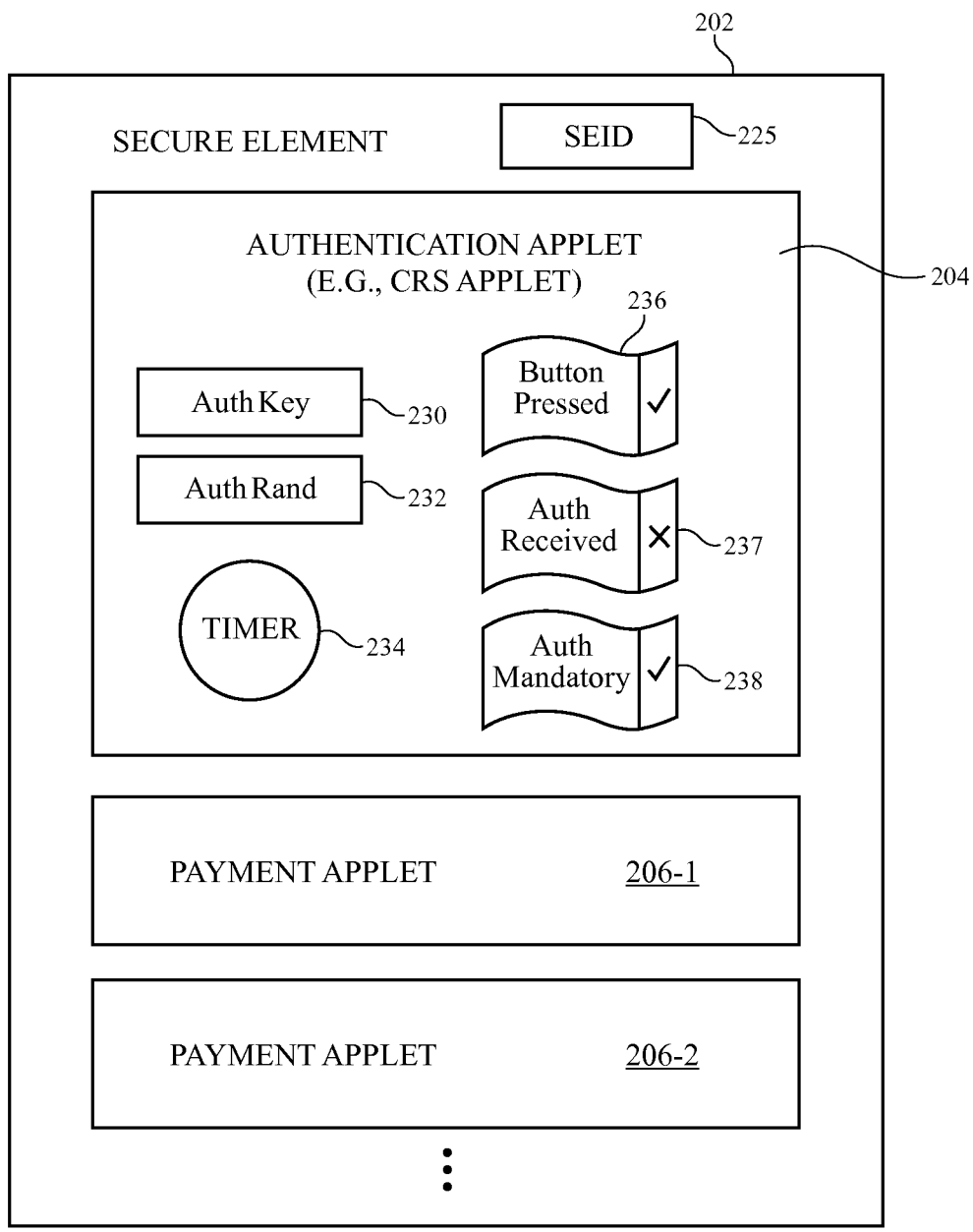
FIG. 5 is a diagram of an illustrative secure element with a contactless registry service (CRS) applet and one or more associated payment applets in accordance with an embodiment.

FIG. 5 shows a diagram of secure element 202, which may include one or more applications or "applets" that run as part of the operating system of secure element 202 (e.g., as a plug-in to a Java runtime environment executing on SE 202). For example, secure element 202 may include an authentication applet 204 that provides contactless registry services (CRS), encrypts/decrypts data that is sent to and received from a trusted processor, sets one or more control flags in the operating system of SE 202, and/or conveys information to one or more payment applets 206 (e.g., payment applets 206-1, 206-2, etc.). Authentication applet 204 is therefore sometimes referred to as a CRS applet. Commercial credentials associated with a given payment card may be stored in a particular "container" on secure element 202, which is basically the instantiation of a payment applet combined with the encrypted payment data for that instantiation. For example, if two Visa cards are to be provisioned onto the secure element, a Visa payment applet would be instantiated twice into two different containers on the secure element. Each container may have a unique identifier known as an application ID (or AID).

CRS applet 204 may be executed in a master or "issuer" security domain (ISD) in secure element 202, whereas payment applet(s) 206 may be executed in supplemental security domains (SSDs). For example, keys and/or other suitable information for creating or otherwise provisioning one or more credentials (e.g., credentials associated with various credit cards, bank cards, gift cards, access cards, transit passes, etc.) on device 102 and/or for managing credential content on device 102 may be stored on the CRS applet 204. Each payment applet 206 may be associated with a specific credential (e.g., a specific credit card credential, a specific public transit pass credential, etc.) that provide specific privileges or payment rights to device 102. Communications between these security domains may be encrypted using different encryption/decryption keys that are security-domain specific (e.g., each SSD may have its own manager key associated with a respective payment applet 206 that is used to activate/enable a specific credential of that SSD for use during an NFC-based transaction at merchant terminal 108).

In one suitable arrangement, applications processor 200 on secondary user device 102 (see, FIG. 4) may be configured to run a mobile payments application. This payments application may allow the user to store credit cards, debit cards, retail coupons, boarding passes, event tickets, store cards, gift cards, loyalty cards, generic cards, and/or other forms of mobile payment. Each of these digital cards, coupons, or tickets is sometimes referred to as a "pass." As a result, the mobile payments application is sometimes referred to as a "passbook" application or a digital wallet application. The passbook application may include passes corresponding to respective payment applets 206 for use in conducting a financial transaction. Each pass (sometimes referred to herein as passbook pass, a digital wallet pass, etc.) in the passbook may be either in an activated (or personalized) state or a disabled (non-personalized or personalizing) state. A personalized pass may indicate that a corresponding payment applet 206 has been provisioned with the desired commerce credential and is ready for payment. A non-personalized pass may indicate that a corresponding payment applet 206 has not yet been provisioned with the necessary commerce credential and is therefore not payment-ready.

In one suitable embodiment, secure element 202 may be paired with one corresponding trusted processor such as processor 200 using an authorization key or "AuthKey." This pairing of a secure element with a trusted processor using AuthKey should only be performed once during the manufacturing of these components. The AuthKey for a given secure element and trusted processor pair may be derived based on an unique SEID 225 of the secure element (FIG. 5) in that given pair and/or a unique identifier (UID) 224 of the trust processor (FIG. 4) in that given pair. The AuthKey serves as a component-level secret key that is not known to the user and serves to bind a secure element to a corresponding processor so the secure element knows who to trust (e.g., the AuthKey helps to set up a secure channel between the secure element and the associated applications processor 200).

The AuthKey can be stored within the secure element (e.g., AuthKey 230 may be stored at the CRS applet 204 on secure element 202) but need not be stored at applications processor 200. The applications processor on the secondary user device 102 may be capable of re-deriving the AuthKey on-the-fly when it needs to communicate with the paired secure element based on at least one of its own UID 224 and/or the SEID 225 obtained from the corresponding secure element.

While the AuthKey effectively binds the secure element 202 to the trusted processor 200, a random authorization number "AuthRand" may be used to bind the user to the trusted processor 200. Referring to FIG. 4, AuthRand may be a randomly generated number that is stored on the user keychain (e.g., AuthRand 229 may be stored as part of keychain 228 that is maintained at the applications processor 200). As described above in connection with FIG. 1, the user keychain 228 may include information that is only related to a particular user.

As shown in FIG. 5, AuthRand can also be stored within the secure element (e.g., AuthRand 232 may be stored at the CRS applet 204 on secure element 202). In general, the trusted processor may be configured to generate a new AuthRand value and to inject the newly generated AuthRand value into the corresponding secure element 202 (e.g., by overwriting the old AuthRand value on the secure element with the newly generated AuthRand value) in response to detecting an ownership change at the user device. Operated in this way, the trusted processor (e.g., applications processor 200) serves to locally track any ownership change at user device 102 by monitoring the status of the user keychain (as an example).

Any currently provisioned payment applets 260 on secure element 202 may be immediately deactivated for payment in response to detecting injection of a new AuthRand. Configured in this way, the protection of sensitive user credentials at the secure element is enhanced by using the trusted processor to ensure that a new user obtaining device 102 as a result of an ownership change (whether or not the ownership change is intended) will not be able to use the newly acquired device to perform mobile transactions commerce credentials associated with the original user.

As shown in FIG. 5, the CRS applet 204 may also include one or more control flags for use in activating payment applets 206 on the secure element 202. For example, CRS applet 204 may include a "button pressed" flag 236, an "authorization received" flag 237, an "authentication mandatory" flag 238, and/or other suitable flags. The button pressed flag 236 may be used to indicate whether the user has pushed a button 17 on user device 102 (see, FIG. 2B). For example, the default value for the button pressed flag is '0.' When device 102 has detected that a user has pressed button 17, the button pressed flag may be set to a value of '1' (i.e., the button pressed flag may be asserted). In one suitable arrangement, the button pressed flag may only be set to '1' if the user double presses button 17. In another suitable arrangement, the button pressed flag may only be asserted if the user triple presses a button 17. In yet another suitable arrangement, the button pressed flag may only be asserted if the user holds down button 17 for more than one second, for more than two seconds, for more than three seconds, etc.

In general, flag 236 serves as a flag that is asserted in response to some user input that initiates any operations that need to be carried out in order for device 102 to perform a mobile payment transaction. The button pressed flag 236 is therefore merely illustrative and does not serve to limit the scope of the present invention. If desired, other ways of allowing the user to initiate payment at a merchant terminal may be implemented. Additionally or alternatively, CRS applet 204 may be provided with a "fingerprint detected" flag that is set when a fingerprint sensor on devices 102 detects the fingerprint of an authorized user, a "swipe detected" flag that is set when a touchscreen on device 102 receives a particular swiping motion from the authorized user, a "tap detected" flag that is set when a touchscreen on device 102 receives a double tap from the authorized user, a "buttons pressed" flag that is set when multiple buttons on device 102 are simultaneously pressed by the authorized user, a "voice command received" flag that is set when a microphone on device 102 detects a voice command from the authorized user (e.g., if the user says "pay"), and/or other suitable flags. Flag 236 may therefore sometimes be referred to generally as a "user input" flag or a "user input received" flag.

The authorization received flag 237 may serve as a flag that is asserted only when the secure element has been authorized to carry out a financial transaction (i.e., when secure element 202 receives an authorized payment activation request). Flag 237 may have a default value of '0.' The authorized payment activation request (sometimes referred to herein as an authorized NFC activation request) may be sent from the applications processor 200 to the secure element 202 in response to detecting a predetermined user input for initiating payment (as an example). If desired, other events triggered by the user may result in setting the authorization received flag 237.

The authorization received flag 237 may only be relevant if the authorization mandatory flag 238 is set to '1.' Flag 238 may be set to '1' by default. When the authorization mandatory flag 238 has been set to '1' (i.e., when flag 238 is asserted), the authorization received flag 237 must have been set to '1' in order for a payment to be processed. When the authorization mandatory flag 238 has been set to '0' (i.e., when flag 238 is deasserted), the current state of the authorization received flag 237 does not matter. Assuming that flag 238 is set to '1,' when both user input flag 236 and authorization received flag 237 have been asserted, a payment applet 206 may be temporarily activated to carry out a mobile payment transaction. In the example of FIG. 5, button pressed flag 236 may have already been asserted (as indicated by the ✓ symbol) while authorization received flag 237 is still in the default cleared/deasserted state (as indicated by the x symbol). In this example, secure element 202 may still be waiting for an authorized activation command to be sent from the applications processor to set flag 237 high.

When both flags 236 and 237 are high, a selected payment applet of the secure element may be temporarily activated to complete a payment. The amount of time for which the selected payment applet will be activated may be monitored using a timer such as timer 234 (see, FIG. 5). Timer 234 is shown as being a part of CRS applet 204 but can also be implemented on other parts of device 102.

Figure 6:
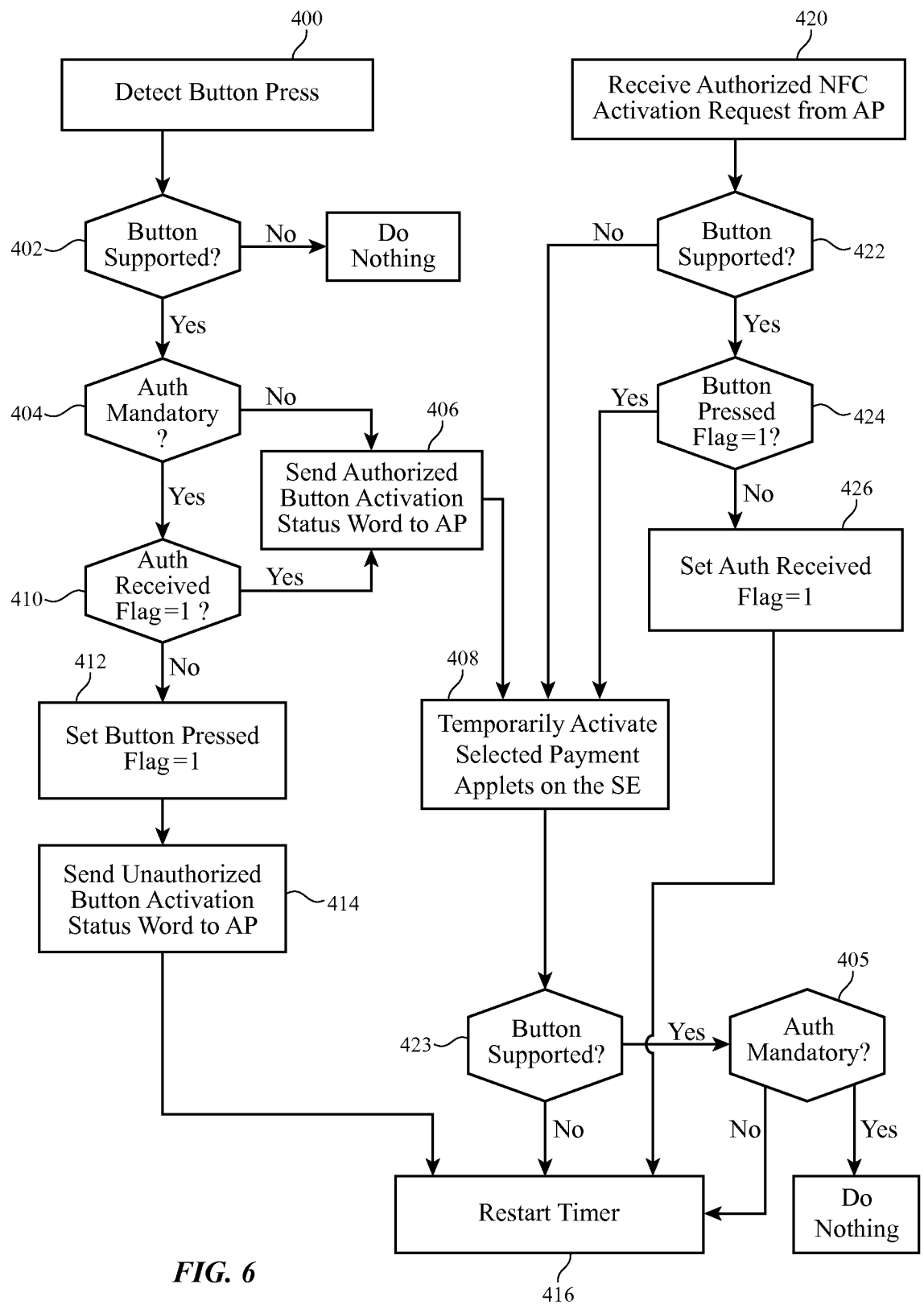
FIG. 6 is a flow diagram of illustrative steps involved in activating a payment applet in accordance with an embodiment.

FIG. 6 is a flow diagram showing illustrative steps involved in activating the secure element for payment on a secondary user device 102. At step 400, the power management unit in the secondary user device may detect a button press (or other required user input, as described above in connection with flag 236). Subsequently, the secondary user device may check whether the button press is support for payment (at step 402). If the button press is not supported for payment, no further action is needed. If, however, the button press is supported, processing may proceed to step 404.

At step 404, the CRS applet may check whether the authorization mandatory flag (e.g., flag 238 in FIG. 5) has been asserted. If the authorization mandatory flag has been set low, then step 406 may be performed. At step 406, the secure element may send an "authorized button activation" status word to the applications processor to indication a successful activation event. Thereafter, a selected payment applet in the secure element may be temporarily activated for payment (at step 408). This temporary activation of a payment applet is sometimes referred to as a transient payment applet activation period. This particular flow of events represents one way that a payment applet can be activated for payment.

In response to activating a payment applet, the secondary user device may again check whether the button press is support for payment (at step 423). If the button press is not supported for payment, a timer (e.g., timer 234 in FIG. 5) may be restarted to keep track of the time that the payment applet should be activated (step 416). If, however, the button press is supported, processing may proceed to step 405. At step 405, the CRS applet may check whether the authorization mandatory flag (e.g., flag 238 in FIG. 5) has been asserted. If the authorization mandatory flag has been set low, then step 416 may be performed. If the authorization mandatory flag has been set high, then no further action is performed.

Returning back to step 404, if the authorization mandatory flag has been set high, then the CRS applet may be configured to check whether the authorization received flag has been asserted (at step 410). If the authorization received flag has already been set high, processing may loop to step 406 and subsequently to step 408 to activate a payment applet. This particular flow of events represents another way that the secure element can be activated for payment.

If, however, the authorization mandatory flag has yet to be set (i.e., if the authorization mandatory flag is in the deasserted state), then the CRS applet may proceed to set the button pressed flag high, at step 412. Asserting the button pressed flag in this way indicates the successful detection of a button press, but since the authorization mandatory flag is high, the CRS applet is still waiting for the authorization received flag to be asserted before activating a payment applet. At step 414, the secure element may be configured to send an unauthorized button activation status word to the applications processor, indicating that a button press has been detected while letting the applications processor know that it is still waiting for an authorized NFC activation request from the applications processor. Following step 414, the timer may be reset (step 416) to limit the amount of time within which the secure element must receive the authorized NFC activation request from the applications processor.

At step 420, the secure element may receive an authorized NFC activation request from the applications processor. This activation request may be sent after a series of authentication commands have been exchanged between the applications processor and the secure element. In at least one suitable arrangement, the series of authentication commands may be exchanged as a result of a button activation status word being received at the applications processor. In general, other suitable events may trigger the exchange of the authentication commands.

Subsequently, the secondary user device may check whether the button press is support for payment (at step 422). If the button press is not supported for payment, step 408 may immediately be performed to activate a selected payment applet. This particular flow of events represents yet another way that the secure element can be activated for payment. In this case, a button press from the user is not necessary, but other suitable initiation event(s) such as detection of a nearby field from a merchant terminal or receipt of a special message from the merchant terminal may result in an authorized NFC activation request to be received at the secure element.

If, however, the button press is supported, processing may proceed to step 424. At step 424, the CRS applet may check whether the button pressed flag has been set high. If the button pressed flag has already been asserted, step 408 may be subsequently performed to activate a selected payment applet. This particular flow of events represents yet another way that the secure element can be activated for payment.

At step 424, if the button pressed flag is in the deasserted state, then the CRS applet may proceed to assert the authorization received flag (step 426). Setting the authorization received flag high in this way indicates the successful receipt of an activation request from the applications processor, but since the button pressed flag is still low, the CRS applet may still have to wait for the button pressed flag to be asserted before activating a payment applet. This scenario may only occur if the applications processor sends the authorized NFC activation request to the secure element as a result of an event other than the button press event. Following step 426, the timer may be restarted to limit the amount of time within which the user has to provide the button press or other required input to initiate payment (step 416).

Figure 7:
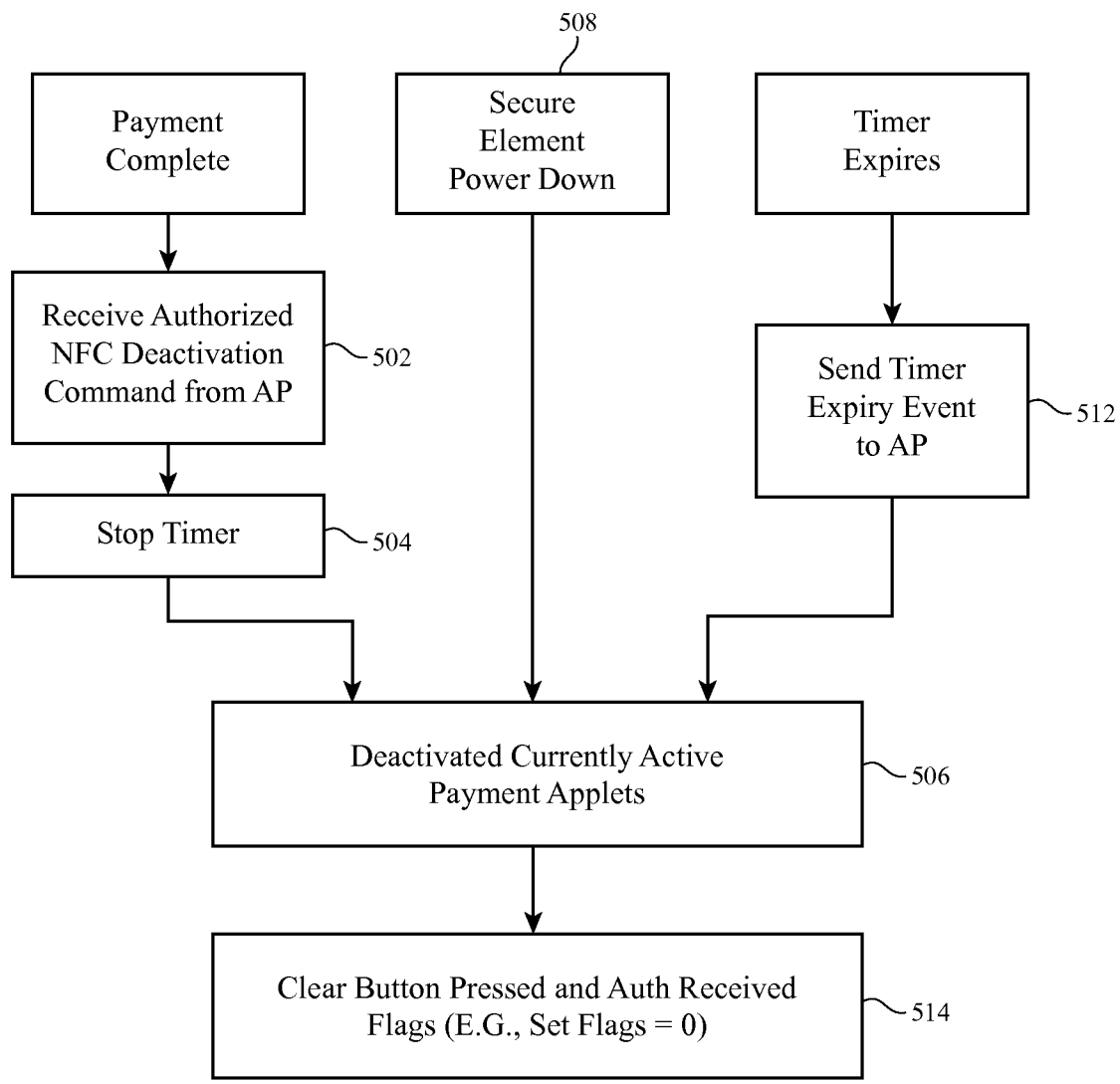
FIG. 7 is a flow diagram of illustrative steps involved deactivating a payment applet in accordance with an embodiment.

FIG. 7 is a flow diagram showing illustrative steps involved in deactivating a payment applet on the secure element. When a mobile payment transaction has completed, the secure element may receive an authorized NFC deactivation command from the applications processor (at step 502). At step 504, the timer may be stopped. Processing may then proceed to step 506 to deactivate one or more currently active payment applets. This represents one particular flow of events for deactivating a payment applet.

If the secure element powers down or is put to sleep for any reason (as detected at step 508), any currently active payment applets may automatically be deactivated (step 506). This may be inherent as payment applets are running on the secure element. This represents another flow of events that can result in deactivation of a payment applet.

In another suitable scenario, if the timer expires before a payment is completed, the secure element may send a timer expiry event status word to the applications processor (at step 512). This may occur if only one of the two flags that are required for the transient payment applet activation has been asserted prior to the timer expiring. For example, the timer may be restarted when a button press event has been detected but may expire before receiving an authorized NFC activation request. As another example, the timer may be restarted in response to receiving an authorized NFC activation request but may expire before detecting a button press event. Following step 512, step 506 may be performed to deactivate one or more payment applets. This represents another flow of events that can result in the deactivation of a payment applet.

Following step 506, step 514 may be performed to clear the button pressed flag and the authorization received flag (e.g., to deassert both the button pressed flag and the authorization received flag). If desired, other ways of using the CRS applet to deactivate one or more payment applets may also be implemented.

The operations of FIGS. 6 and 7 for enabling and disabling the payment function on a user electronic device are merely illustrative and do not serve to limit the scope of the present invention. In general, the approach of the type described in connection with FIGS. 6 and 7 can be extended to any device having a secure element. If desired, the CRS applet may include other flags for ensuring that all criteria have been met before activating a payment applet.

Although the methods of operations were described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

The foregoing is merely illustrative of the principles of this invention and various modifications can be made by those skilled in the art. The foregoing embodiments may be implemented individually or in any combination.

Although the invention has been described in some detail for the purposes of clarity, it will be apparent that certain changes and modifications can be practiced within the scope of the appended claims. Although some of the appended claims are single dependent only or reference only some of their preceding claims, their respective feature(s) can be combined with the feature(s) of any other claim.

What is claimed is:

1. A method of operating a portable electronic device that includes a secure element, a user input device, near-field communications circuitry, and an associated processor that communicates with the secure element, comprising:
   with the near-field communications circuitry, detecting a merchant terminal;
   with the processor, sending an authorized payment activation request to the secure element in response to detecting the merchant terminal;
   with a contactless registry service (CRS) applet on the secure element, determining that a user input received flag has not been asserted after the authorized payment activation request has been sent;
   after receiving the authorized payment activation request at the secure element and responsive to determining that the user input received flag has not been asserted, asserting an authorization received flag with the CRS applet on the secure element;
   with the user input device, after the authorized payment activation request has been sent, detecting an input for initiating a mobile payment transaction and sending a signal indicative of the detected input to the CRS applet;
   after the authorization received flag has been asserted, asserting the user input received flag with the CRS applet on the secure element in response to receiving the signal from the user input device;
   with the CRS applet on the secure element, determining that both the user input received flag and the authorization received flag have been asserted; and
   with the secure element, temporarily activating a selected payment applet on the secure element to complete the mobile payment transaction in response to determining that both the user input received flag and the authorization received flag have been asserted.

2. The method defined in claim 1, further comprising:
   upon completion of the mobile payment transaction, deasserting the user input received flag and the authorization received flag.

3. The method defined in claim 1, wherein detecting the user input comprises detecting a button press from an authorized user.

4. The method defined in claim 1, wherein detecting the user input comprises detecting a double button press.

5. A portable electronic device, comprising:
   a user input device configured to receive a predetermined input;
   near-field communications circuitry configured to detect a merchant terminal;
   an applications processor configured to send a payment activation request to the secure element before a user input received flag has been asserted in response to the portable electronic device using the near-field communications circuitry to detect the merchant terminal; and
   a secure element configured to securely store commerce credentials, to assert the user input received flag in response to receiving the predetermined input at the user input device, to determine whether the user input received flag has been asserted, and to assert an authorization received flag in response to determining that the user input received flag has not been asserted and receiving the payment activation request from the applications processor.

6. The portable electronic device defined in claim 5, wherein the secure element is further configured to activate a corresponding payment applet when the predetermined user input and the payment activation request have both been received.

7. The portable electronic device defined in claim 5, wherein the user input device comprises a button, and wherein the predetermined input at the user input device comprises at least one button press on the button.

8. The portable electronic device defined in claim 5, further comprising:
   a timer that is restarted whenever at least one of the user input received and authorization received flags is asserted.

9. The portable electronic device defined in claim 8, wherein the secure element is further configured to deactivate a payment applet when the timer reaches a predetermined value.

10. A method of operating an electronic device that includes a secure element and an applications processor, the method comprising:
- with an input device on the electronic device, receiving an input for conducting a mobile payment transaction;
- after receiving the input, asserting a button-pressed flag with a contactless register service (CRS) implemented on the secure element applet responsive to confirming that an authorization-received-flag has not been asserted;
- with near-field communications circuitry in the electronic device, detecting a merchant terminal;
- in response to detecting the merchant terminal, using the applications processor to send a payment activation request to the CRS applet;
- in response to receiving the payment activation request at the CRS applet, using the CRS applet to assert the authorization-received flag; and
- in response to determining that both the button-pressed flag and the authorization-received flag have been asserted, using the secure element to activate a payment applet on the secure element to perform the mobile payment transaction.

11. The method of claim 10, further comprising:
- in response to determining that both the button-pressed flag and the authorization-received flag have been asserted, temporarily activating a payment applet on the secure element.

12. The method of claim 11, further comprising:
- in response to activating the payment applet, restarting a timer.

13. The method of claim 12, further comprising:
- in response to receiving a payment deactivation request from the applications processor, deactivating the payment applet and stopping the timer.

14. The method of claim 12, further comprising:
- in response to the timer reaching a predetermined threshold value, deactivating the payment applet and deasserting the button-pressed flag and the authorization-received flag.

15. The method of claim 1, wherein the determination that the user input received flag has not been asserted directly causes the assertion of the authorization received flag.

16. The method of claim 1, wherein the assertion of the authorization received flag is performed within a predetermined period of time after determining that the user input received flag has not been asserted.

17. The method of claim 16, wherein the assertion of the authorization received flag occurs immediately following the determination that the user input received flag has not been asserted.

18. The method of claim 16, wherein there are no intervening steps between determining that the user input received flag has not been asserted and asserting the authorization received flag.

19. The method of claim 5, wherein the assertion of the authorization received flag is in direct response to the confirmation that the input received flag has not been asserted.

20. The method of claim 1, further comprising:
- restarting a timer when at least one of the user input received flag or the authorization received flag is asserted.

21. The method of claim 20, further comprising:
- with the secure element, deactivating the selected payment applet when the timer reaches a predetermined value.

* * * * *